3,284,699
OPTICAL PUMPING MAGNETOMETER
Léon Malnar, Paris, France, assignor to CSF—Compagnie Generale de Telegraphie Sans Fil, a corporation of France
Filed Jan. 16, 1964, Ser. No. 338,122
Claims priority, application France, Jan. 22, 1963, 922,220, Patent 1,354,208
7 Claims. (Cl. 324—.5)

The present invention relates to optical pumping magnetometers. As is known, such magnetometers are suitable for measuring the intensity of continuous magnetic fields, such as the terrestrial magnetic field. However, they provide no indication of the direction of that field, since their sensing element detects only the field intensity applied thereto.

It is an object of the invention to provide a magnetometer of the above type, which is capable of measuring both the intensity of a constant magnetic field and its components along three fixed or moving axes.

According to the invention, there is provided an optical pumping magnetometer including means for superimposing on the magnetic field to be measured three alternating fields, directed along the three reference axes, of suitably chosen different frequencies and for collecting, at the magnetometer output, the continuous component and the three alternating components of the output signal.

The invention will be better understood from the following description and the appended drawing, in which:

FIG. 1 shows at a point O, the continuous magnetic field $\vec{H_0}$ which is to be measured. Point O is associated with the trirectangular reference frame $Oxyz$.

The problem consists in measuring both field $\vec{H_0}$ and its projections $H_{ox}$, $H_{oy}$, $H_{oz}$ on the three axes of the reference frame.

To this end, according to the invention, means are provided for generating; along axes $O_x$, $O_y$, $O_z$ respectively, three magnetic fields which have fixed directions and an intensity which varies periodically as a function of time, viz:

Along $Ox: H_x = H_1 \sin \omega_1 t$;
Along $Oy: H_y = H_1 \sin \omega_2 t$;
Along $Oz: H_z = H_1 \sin \omega_3 t$.

Let $\cos \alpha_1$, $\cos \alpha_2$ and $\cos \alpha_3$ be the director cosines of field $\vec{H_0}$. The components of the resultant field $\vec{H}$ along the three coordinate axes may be written:

$$H_0 \cos \alpha_1 + H_1 \sin \omega_1 t$$
$$H_0 \cos \alpha_2 + H_1 \sin \omega_2 t$$
$$H_0 \cos \alpha_3 + H_1 \sin \omega_3 t$$

Making $H_1$ small compared to $H_0$, the intensity of the field $\vec{H}$ measured, for example, by an optical pumping magnetometer can be written:

$$H = H_0 \sqrt{1 + \frac{H_1^2}{H_0^2} \Sigma \sin^2 \omega_i t + 2 \frac{H_1}{H_0} \Sigma \cos \alpha_i \sin \omega_i t}$$

Neglecting the term in $H_1^2/H_0^2$, then:

$$H \cong H_0 \sqrt{1 + 2 \frac{H_1}{H_0} \Sigma \cos \alpha_i \sin \omega_i t}$$

disregarding the terms of the second order:

$$H \cong H_0 + H_1 \cos \alpha_1 \sin \omega_1 t$$
$$+ H_1 \cos \alpha_2 \sin \omega_2 t$$
$$+ H_1 \cos \alpha_3 \sin \omega_3 t$$

It will therefore suffice to insert a low-pass filter at the magnetometer output in order to know $H_0$, and three band-pass filters set respectively on $\omega_1$, $\omega_2$ and $\omega_3$, to know the terms $H_1 \cos \alpha_1$, $H_1 \cos \alpha_2$, $H_1 \cos \alpha_3$; $H_1$ being known, $\cos a_1$, $\cos \alpha_2$ and $\cos \alpha_3$ are respectively obtained.

Figure 1:
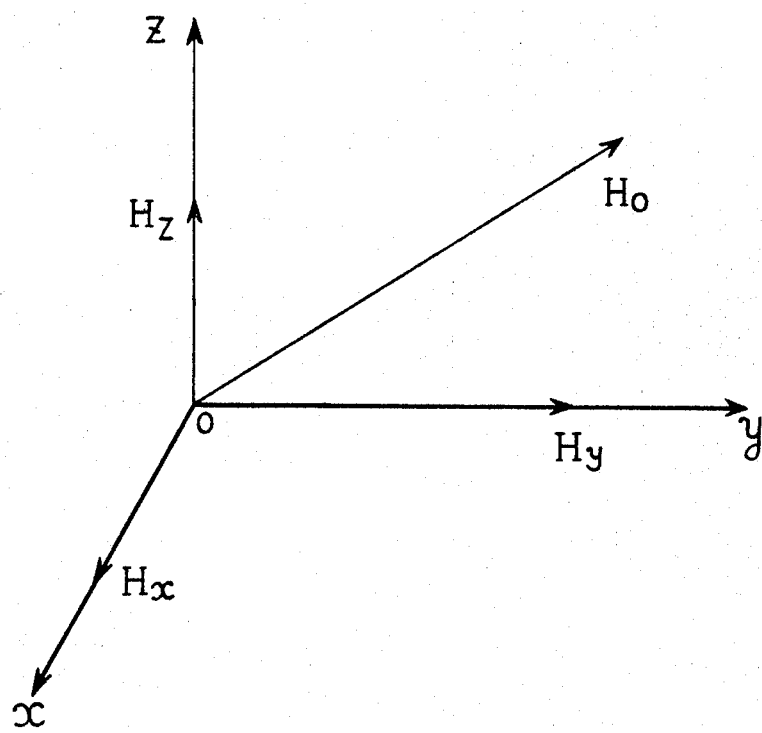
FIG. 1 is a diagram explaining the principle of the invention.
Figure 2:
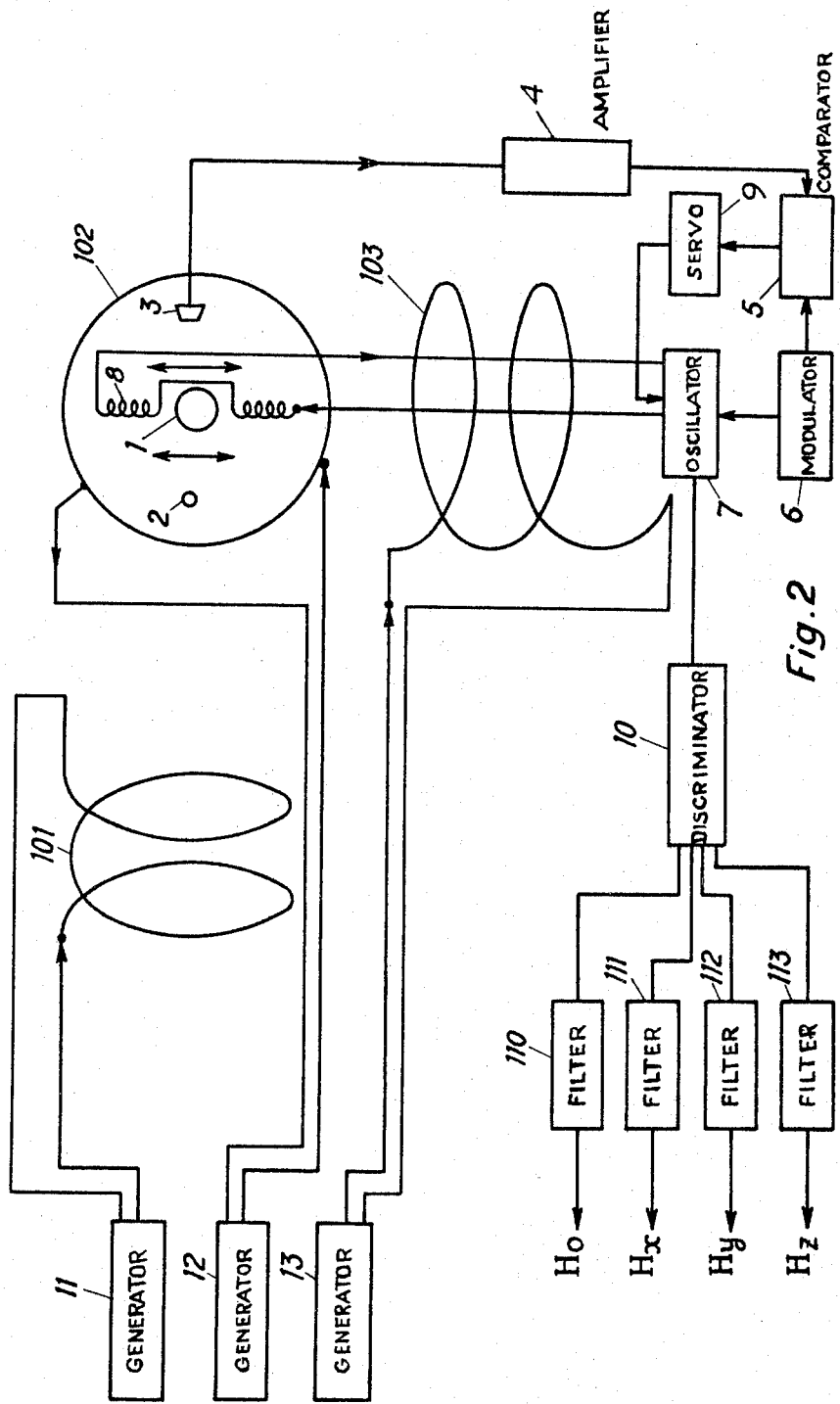
FIG. 2 is a block diagram of one embodiment of a magnetometer arrangement according to the invention.

FIG. 2 shows a diagram of a first embodiment of the invention.

This figure shows a conventional optical pumping magnetometer with its usual components, i.e., a resonance cell 1, a light source 2, a photoelectric cell 3, whose output is connected to amplifier 4, and a first input of phase comparator 5. The second input of comparator 5 receives the output signal from a modulator 6, which controls oscillator 7 supplying the energy to resonance coils 8. The oscillator is controlled by a negative feedback loop including servo-mechanism 9 connected to the output of comparator 5. The frequency of oscillator 7 follows up the resonance frequency of cell 1, which is a function of the field H. Consequently, this frequency is an indication on the value of the magnetic field to be measured. This frequency is measured by means of discriminator 10.

This structure is thoroughly conventional and need not be described in more detail.

According to the invention, the resonance cell is placed in the fields of three coils 101, 102 and 103, whose axes form a trirectangular trihedron. These coils are fed from generators 11, 12 and 13 with respective angular frequencies $\omega_1$, $\omega_2$ and $\omega_3$. Discriminator 10 is coupled to four filters 110, 111, 112, 113.

Filter 110 is a low-pass filter, which supplies the information on field $H_0$.

Filters 111, 112, 113 are band-pass filters respectively centered on angular frequencies $\omega_1$, $\omega_2$ and $\omega_3$. At their outputs, information about $H_{ox}$, $H_{oy}$ and $H_{oz}$ respectively is collected, that is to say the three director cosines of the field to be measured with respect to the respective axes $Ox$, $Oy$, $Oz$ of coils 101, 102 and 103.

It is clear that these axes may be fixed in direction with respect to $H_0$, for example of the terrestrial magnetic field, if it is this field that has to be measured. They can also be three axes linked up to the vehicle, ship or aircraft, which carries the magnetometer. It is then possible to use the outputs of the three filters to ensure the stabilization of the vehicle with respect to the earth's field.

Figure 3:
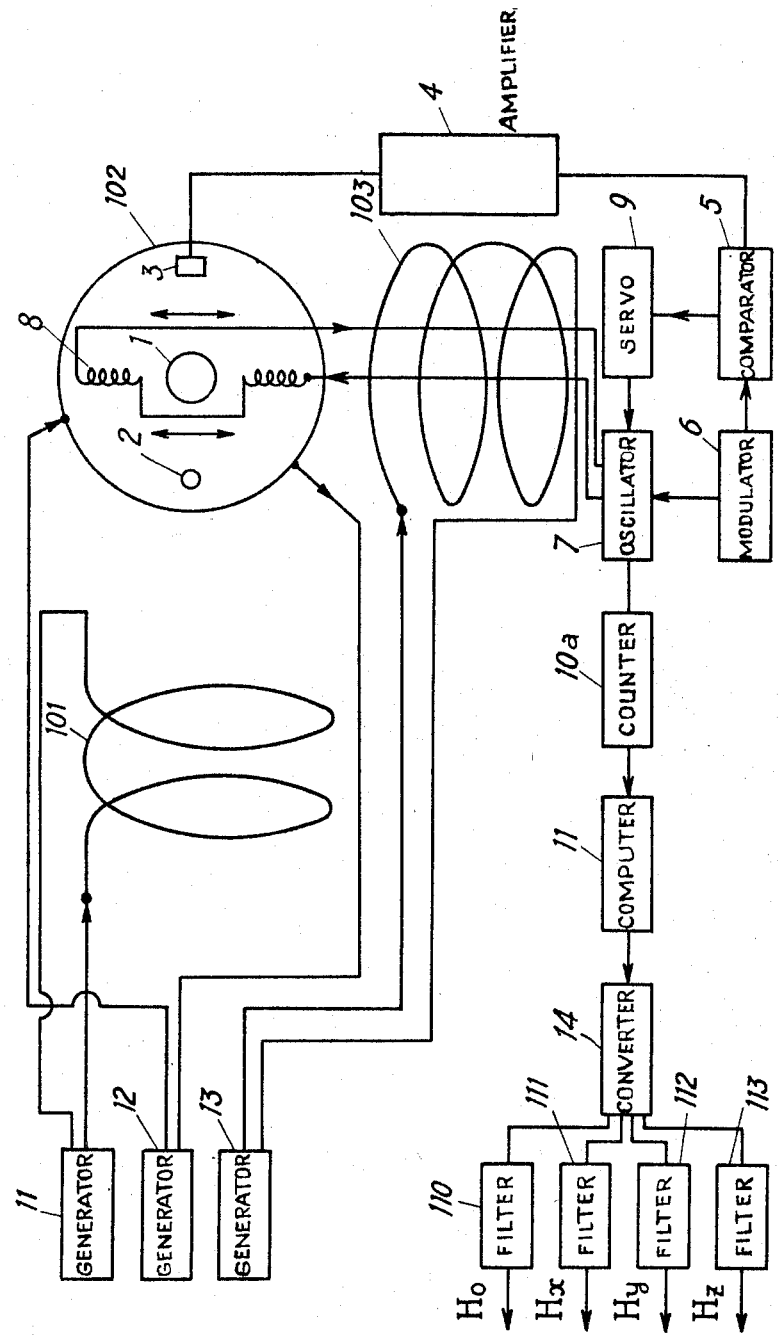
FIG. 3 is a block diagram of a modification.

FIG. 3 is a modification in which the field measured is H, $H^2$ being derived from the measurement of H. For it can be shown that the precision of the measurement of $\cos \alpha_1$, $\cos \alpha_2$ and $\cos \alpha_3$ is better when $H^2$ is known.

In FIG. 3 the same reference numbers designate the same components as in FIG. 2. Discriminator 10 is replaced by a counter 10a which measures the instantaneous frequency n of generator 7. A digital computer 11 which receives the number n, and derives $n^2$. This number is proportional to $H^2$.

It is converted to an instantaneous voltage proportional to $n^2$ by a converter 14, at whose output filters 110, 111, 112 and 113 are connected. The waveform of said digital-to-analog decoded voltage carries the information relative to the magnitude and the director cosines of field $H_0$; said information items are separated from each other according to their respective carrier frequencies.

It is known that:

$$H^2 \sim H_0^2 \left(1 + 2\frac{H_1}{H_0}\Sigma \cos \alpha_i \sin \omega_i t\right)$$

Filters 111, 112 and 113 will then give at their respective outputs the informations $\cos \alpha_1$, $\cos \alpha_2$ and $\cos \alpha_3$, which are readable on a plurality of calibrated A.C. voltmeters.

As a non restrictive example, the resonance frequency f of the magnetometer is of the order of $10^5$ c./s.

The carrier frequencies $f_1$, $f_2$ and $f_3$ corresponding to angular frequencies $\omega_1$, $\omega_2$ and $\omega_3$ are of the order of $10^{-4}f$. In order to avoid intermodulation effects, carrier frequencies $f_1$, $f_2$ and $f_3$ may be related to each other as 8, 10 and 13.

Of course, the invention is not limited to the embodiments shown which were given solely by way of example.

What is claimed is:

1. A magnetometer capable of measuring magnetic field intensities, comprising: a single field intensity sensing element; one output coupled to said element; means for superimposing, on the magnetic field to be measured, three alternating fields, directed along predetermined reference axes, said fields having fixed respective frequencies; three band pass filters connected to said output, respectively centered on said frequencies, and a low pass filter connected at said output.

2. An optical pumping magnetometer capable of measuring field intensities, comprising: an optical resonance cell having a resonance frequency responsive to the applied magnetic field; field generator means for creating in said cell an ultra-high frequency field, said means having an output; a feedback loop, comprising a photoelectric cell, for maintaining the frequency of said ultra-high frequency field equal to the resonant frequency of said cell; means for creating three alternating fields directed along three predetermined reference axes, said fields having constant respective frequencies; three band pass filters connected to said output, respectively centered on said respective frequencies, and a low pass filter connected at said output.

3. An optical pumping magnetometer capable of measuring field intensities, comprising: an optical resonance cell having a resonance frequency responsive to the applied magnetic field; an oscillator feeding coil means for creating in said cell an ultra-high frequency field, said oscillator having an output; a feedback loop for maintaining the frequency of said ultra-high frequency field equal to the resonant frequency of said cell, said feedback loop comprising a photoelectric cell, and a comparator, connected to said photoelectric cell and to said oscillator and having a control output for controlling said oscillator frequency; means for creating three alternating fields directed along three predetermined reference axes, said fields having constant respective frequencies; three band pass filters connected to said output, respectively centered on said respective frequencies, and a low pass filter connected at said output.

4. An optical pumping magnetometer capable of measuring filed intensities comprising: an optical resonance cell having a resonance frequency responsive to the applied magnetic field; an oscillator feeding coil means for creating in said cell an ultrahigh frequency field; said oscillator having an output; a feedback loop for maintaining the frequency of said ultra-high frequency field equal to the resonant frequency of said cell, said feedback loop comprising a photoelectric cell, and a comparator, connected to said photoelectric cell and to said oscillator and having a control output for controlling said oscillator frequency; a counter, a computer and a converter, connected in series to said output, said converter having an output; means for creating three alternating fields directed along three predetermined reference axes, said fields having constant respective frequencies; three band pass filters connected to said output of said converter, respectively centered on said respective frequencies, and a low pass filter connected at said output of said converter.

5. An optical pumping magnetometer capable of measuring field intensities, comprising: an optical resonance cell having a resonance frequency responsive to the applied magnetic field; an oscillator feeding coil means for creating in said cell an ultra-high frequency field; said oscillator having an output; a feedback loop for maintaining the frequency of said ultra-high frequency field equal to the resonant frequency of said cell, said feedback loop comprising a photoelectric cell, and a comparator, connected to said photoelectric cell and to said oscillator and having a control output for controlling said oscillator frequency; three coils having respective axes parallel to three predetermined reference axes, for creating in said cell three alternating fields directed along said axes, said fields having constant respective frequencies; three band pass filters connected to said output of said oscillator, respectively centered on said respective frequencies, and a low pass filter connected at said output of said oscillator.

6. An optical pumping magnetometer capable of measuring magnetic field intensities comprising: an optical resonance cell having a resonance frequency responsive to the applied magnetic field; an oscillator having an output and a first coil connected to said output of said oscillator for creating in said cell an ultra-high frequency field; a modulator for frequency modulating said oscillator; a feedback loop for maintaining the frequency of said ultra-high frequency field equal to said resonance frequency; said feedback loop comprising a photoelectric cell, and a comparator having two inputs, respectively connected to said photoelectric cell and to said modulator, and a control output for controlling said oscillator; three coils having respective axes, parallel to said predetermined reference axes, for creating in said cell three alternating fields directed along said axes, said fields having constant respective frequencies; a counter, a computer and a converter connected in series, said converter having an output connected to said output of said oscillator; three band pass filters connected to said output of said converter, respectively centered on said frequencies, and a low pass filter connected to said output of said converter.

7. An optical pumping magnetometer capable of measuring magnetic field intensities comprising: an optical resonance cell having a resonance frequency responsive to the applied magnetic field; an oscillator having an output and a first coil connected to said output of said oscillator for creating in said cell an ultra-high frequency field; a modulator for frequency modulating said oscillator; a feedback loop for maintaining the frequency of said ultra-high frequency field of said ultra-high frequency field equal to said resonance frequency; said feedback loop comprising a photoelectric cell, and a comparator having two inputs, respectively connected to said photoelectric cell and to said modulator, and a control output for controlling said oscillator; three coils having respective axes, parallel to said predetermined reference axes, for creating in said cell three alternating fields directed along said axes, said fields having constant respective frequencies; a frequency discriminator connected to said output of said oscillator and having an output; three band pass filters connected to said output of said discriminator, respectively centered on said respective frequencies and a low pass filter connected to said output of said discriminator.

References Cited by the Examiner

UNITED STATES PATENTS

| | | | |
|---|---|---|---|
| 2,972,105 | 2/1961 | Ghose | 324—43 |
| 3,150,313 | 9/1964 | Dehmelt | 324—0.5 |
| 3,158,802 | 11/1964 | Jung et al. | 324—0.5 |

WALTER L. CARLSON, *Primary Examiner.*

MAYNARD R. WILBUR, CHESTER L. JUSTUS,
*Examiners.*

A. E. RICHMOND, *Assistant Examiner.*